United States Patent [19]

Wilber et al.

[11] Patent Number: 5,320,203
[45] Date of Patent: * Jun. 14, 1994

[54] DAMPER FOR HYDRAULIC CLUTCH ACTUATOR

[75] Inventors: Darrin F. Wilber, Smiths Creek; Julie A. Hartig, Waterford; Richard A. Nix, Auburn Hills; Leslie P. Branum; Michael L. Schwartz, both of Troy, all of Mich.

[73] Assignee: Automotive Products plc, Warwickshire, England

[*] Notice: The portion of the term of this patent subsequent to Mar. 12, 2008 has been disclaimed.

[21] Appl. No.: 667,883

[22] Filed: Mar. 12, 1991

Related U.S. Application Data

[63] Continuation-in-part of Ser. No. 466,051, Jan. 16, 1990, Pat. No. 4,998,609.

[51] Int. Cl.$^5$ .............................. F16D 25/12
[52] U.S. Cl. ................ 192/109 F; 192/30 V; 192/85 C; 303/87; 60/469
[58] Field of Search .............. 192/30 V, 85 C, 109 D, 192/109 F; 303/87; 92/143; 60/469; 138/31

[56] References Cited

U.S. PATENT DOCUMENTS

| | | | |
|---|---|---|---|
| 4,687,084 | 8/1987 | Leigh-Monstevens et al. | 192/85 CA |
| 4,986,404 | 1/1991 | Kajitani et al. | 192/109 F |
| 4,998,609 | 3/1991 | Nix et al. | 192/109 F |
| 5,020,864 | 6/1991 | Tanaka | 303/87 X |
| 5,031,969 | 7/1991 | Siegel | 303/87 X |
| 5,058,961 | 10/1991 | Mergenthaler et al. | 303/87 X |
| 5,070,983 | 12/1991 | Leigh-Monstevens et al. | 192/85 C |

FOREIGN PATENT DOCUMENTS

| | | | |
|---|---|---|---|
| 55-72421 | 5/1980 | Japan | 192/109 F |
| 59-89833 | 5/1984 | Japan | 192/109 F |
| 59-89834 | 5/1984 | Japan | 192/109 F |

Primary Examiner—Richard M. Lorence
Attorney, Agent, or Firm—Krass & Young

[57] ABSTRACT

A damper for use in a hydraulic clutch actuator to attenuate vibrations transmitted from the crankshaft of the engine of the associated vehicle to the clutch pedal. The baffle includes an elongated cylindrical housing positioned in the conduit interconnecting the master and slave cylinders of the actuator coaxial with the axis of the conduit and including a spring biased piston mounted in the bore of the housing. The housing is open at its rear end and closed at its front end by an end wall defining an outlet port for the damper and the piston includes a central through passage defining the inlet port of the damper at the rear end of the through passage. A baffle is provided at the front end of the piston to provide a circuitous path between the central passage of the piston and the outlet port of the damper. The front face of the baffle includes a hemispherical surface which deflects attenuations entering the housing from the slave cylinder and routes the attenuations through the circuitous path defined by the baffle.

14 Claims, 4 Drawing Sheets

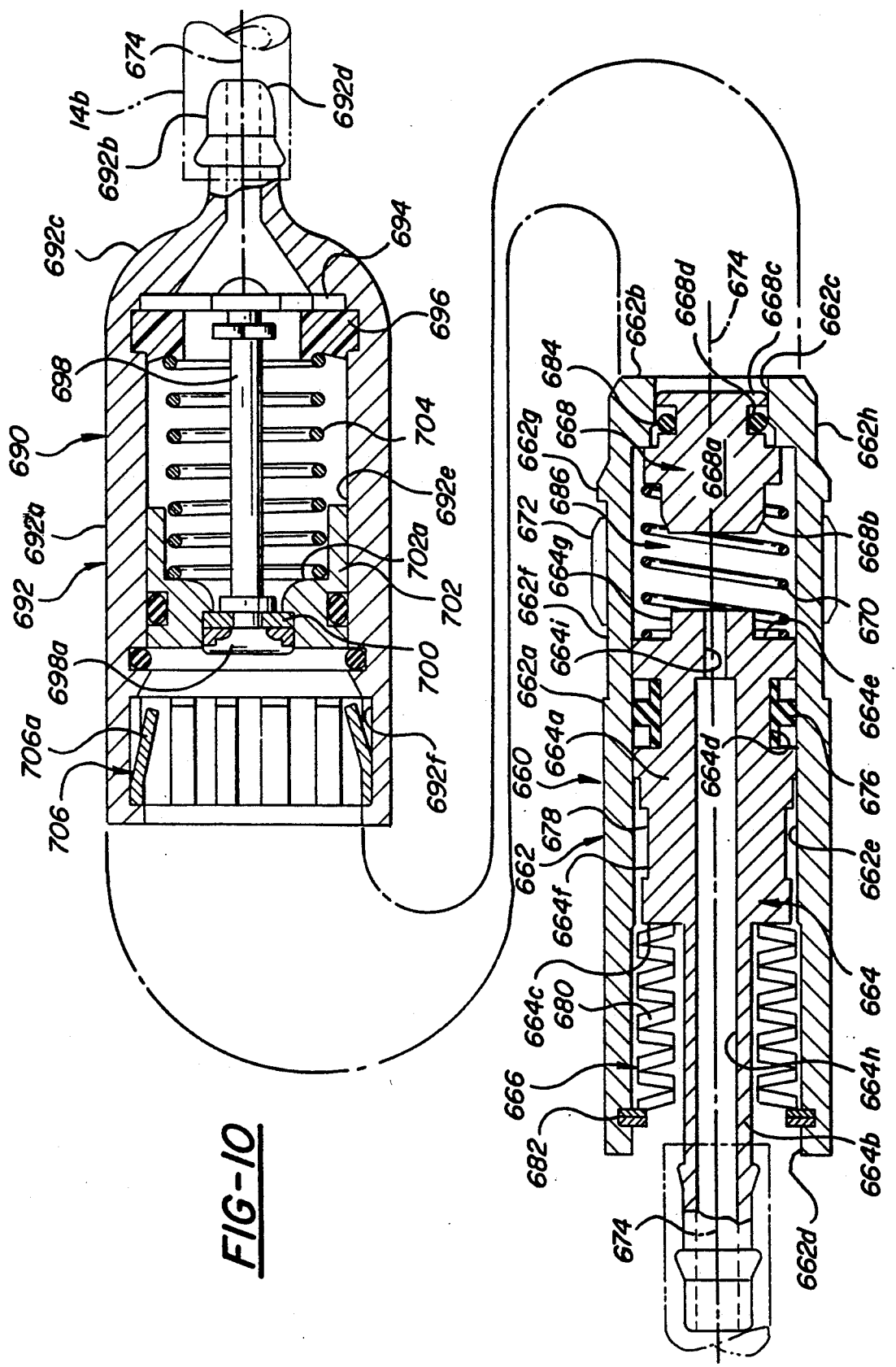

DAMPER FOR HYDRAULIC CLUTCH ACTUATOR

RELATED APPLICATION

This application is a continuation-in-part of application Ser. No. 466,051 filed on Jan. 16, 1990, now U.S. Pat. No. 4,998,609.

BACKGROUND OF THE INVENTION

This invention relates to hydraulic clutch actuation systems and more particularly to hydraulic systems employing a damper mechanism.

Hydraulic actuation systems are known for operating a mechanism at a remote location by way of a master cylinder connected to a slave cylinder installed at a remote location. A conduit interconnects the master cylinder to the slave cylinder and the hydraulic apparatus is filled with hydraulic fluid such that, when the piston of the master cylinder is actuated the piston of the slave cylinder and consequently the piston rod or output member is simultaneously actuated by displacement of the hydraulic fluid from the master cylinder to the slave cylinder through the conduit.

More particularly, it is known to provide such a system for operating the clutch of a motor vehicle so that when the clutch pedal of the vehicle is depressed by the driver, the slave cylinder is actuated to operate the clutch in known manner. Whereas hydraulic clutch actuators have enjoyed significant commercial success they have the ability to transmit vibrations backwardly through the system from the clutch to the clutch pedal with the result that the operator may experience unpleasant vibrations at the clutch pedal.

Specifically, imbalances in the crankshaft of the vehicle engine or engine firing impulses are transmitted to the flywheel which undergoes a swashing movement, the flywheel swashing movement in turn leads to vibrations of the spring fingers of the clutch release mechanism, the vibrations of the spring fingers are transferred to the release bearing of the clutch, and the vibrations propagate backwardly through the hydraulic fluid in the slave cylinder, through the hydraulic fluid in the conduit interconnecting the slave cylinder and the master cylinder, through the hydraulic fluid in the master cylinder, and thence through the master cylinder push rod to the clutch pedal where they are experienced by the operator as vibrations of the clutch pedal. The propagated vibrations also generate fire wall buzz and pedal growl which is audible to the operator as well as a clutch roar which may also be audible to the operator.

Various devices have been proposed in an attempt to attenuate these vibrations. For example, tuned masses have been attached to various parts of the clutch system including the clutch release lever, the slave cylinder push rod, and the clutch pedal. Rubber dampers have also been employed in the master cylinder push rod, rubber hose sections have been employed in the conduit interconnecting the master cylinder and the slave cylinder, and various damper devices have been proposed for installation in the interconnecting conduit.

Whereas these prior art devices have been successful in varying degrees in attenuating the vibrations in the system, they have each suffered one or more shortcomings. Specifically, the prior art devices have been unduly expensive; or they have actually introduced vibrations into the system by virtue of a hysteresis effect; or they have required a package size that has complicated their installation and placement in the crowded under hood environment of a modern day motor vehicle; or they have been difficult to selectively adjust to accommodate varying vehicular applications.

SUMMARY OF THE INVENTION

The present invention is directed to the provision of an improved damper device for use in association with a hydraulic clutch actuator.

According to the invention, the damper includes a hollow body having a first end wall and a second end wall, a first port in the first end wall, a second port in the second end wall, and baffle means located in the housing between the two ports and defining a circuitous fluid flow path between the first and second ports, the baffle means having a concave, semi-spherical end face thereon directed toward the first port so that fluid entering the first port is deflected by the semi-spherical surface to the circuitous flow path.

In the preferred embodiment the damper means comprises a hemispherical surface having passageways therein and which is in abutment with the first end wall.

In a further aspect of the invention, the damper may be placed in the clutch master cylinder so that the baffle means has its hemispherical surface facing the outlet port of the master cylinder.

In further aspect of the invention, the damper is combined with one-half of a quick connect coupling so that the damper may be incorporated in the quick connect coupling in those applications where the master cylinder and slave cylinder are provided as separate prefilled modules and subsequently connected, utilizing the quick connector, following the separate installation of the modules in the motor vehicle.

BRIEF DESCRIPTION OF THE DRAWINGS

FIG. 10 is a detailed longitudinal section of a quick-connect coupling with a built-in damper according to the invention.

DETAILED DESCRIPTION OF THE PREFERRED EMBODIMENT

Figure 1:
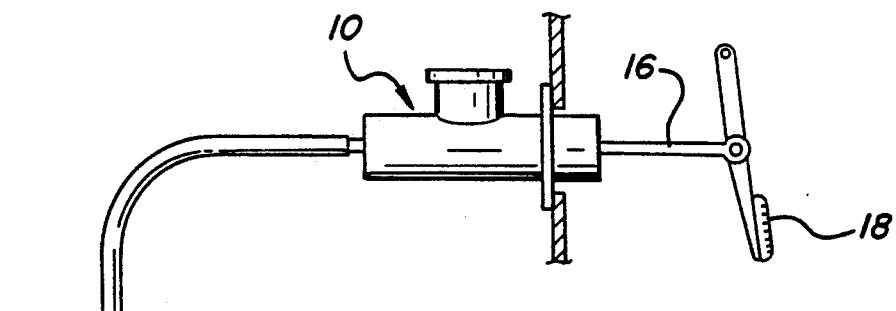
FIG. 1 a schematic view of a hydraulic clutch actuation system employing the invention damper.

The hydraulic clutch actuation system shown in FIG. 1 includes a master cylinder 10, a slave cylinder 12, and a conduit 14 extending between the outlet port of the master cylinder and the inlet port of the slave cylinder.

Master cylinder 10 includes an input rod 16 connected in known manner to the clutch pedal 18 of an associated motor vehicle so that operation of the clutch pedal by the vehicle driver moves a piston of the master cylinder in known manner to discharge pressure fluid from the cylinder.

Slave cylinder 12 is secured as by a bracket 22 to a bell housing 23 enclosing the clutch 24 of the vehicle and includes an output rod 25 coacting in known manner with a clutch release lever 26 pivoted to the bell housing 23. Operation of the clutch pedal 18 by the operator results in discharge of pressure fluid from master cylinder 10, through conduit 14, to slave cylinder 12 to provide extension of output rod 25 and pivotal movement of release lever 26 to move the clutch release bearing 27 in a direction to disengage the clutch 24. Clutch 24 is driven in known manner by a flywheel 30 which in turn is driven by an engine crankshaft 32.

A damper 36 according to the invention is interposed in conduit 14 preferably at a location closer to the inlet of slave cylinder 12 then to the outlet of master cylinder 10.

Figure 2:
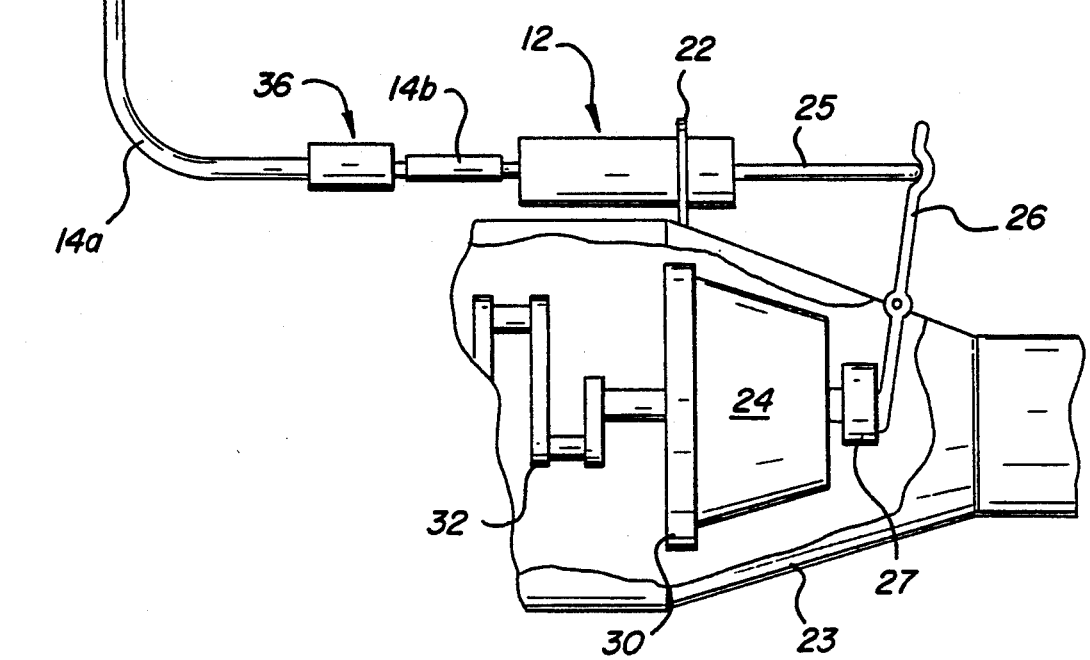
FIG. 2 is a longitudinal cross-sectional view of the invention damper used in FIG. 1.
Figure 2:
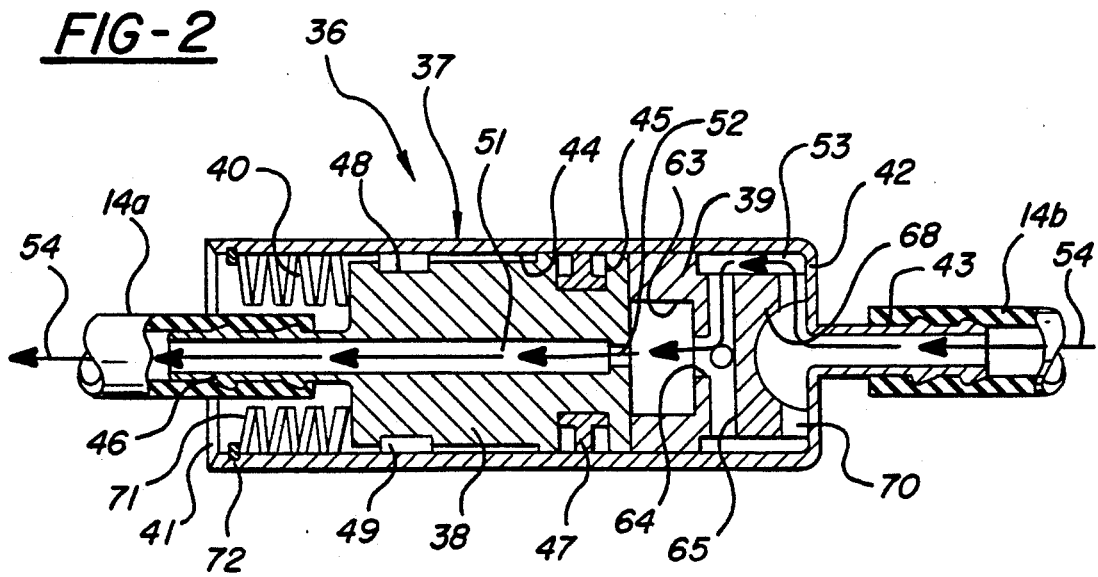

With reference to FIG. 2, the damper 36 includes a cylindrical housing 37, a piston 38 slidably mounted in housing 37, a baffle 39, and spring means 40.

Housing 37 may be formed of a suitable metallic material such as aluminum or steel or, alternatively, may be formed of a plastic material.

Housing 37 is open at the rear end 41 of the housing and is closed at the front end of the housing by a front end wall 42. A tubular outlet fitting 43 extends coaxially and integrally from front end wall 42 and connects with a conduit section 14b connected to slave cylinder 12. Housing 37 has an axial bore 44 in which piston 38 is sealingly slidable.

Piston 38 may be formed of a suitable material such as aluminum, steel or plastic and has a coaxial rearwardly extending fitting portion 46 extending axially outwardly of housing 37. Piston 38 has an annular groove 45 proximate its front end adjacent to the tubular outlet fitting 43 for receipt of an annular seal 47 and a further annular groove 48 proximate its rear end portion for receipt of an annular glide ring 49. Piston fitting portion 46 connects with a conduit section 14a connected to master cylinder 10. A central coaxial passage 51 extends through the fitting portion 46 and through piston 38 itself and terminates in a reduced diameter passage portion 52 opening in the front end of the piston.

Figures 3, 4:
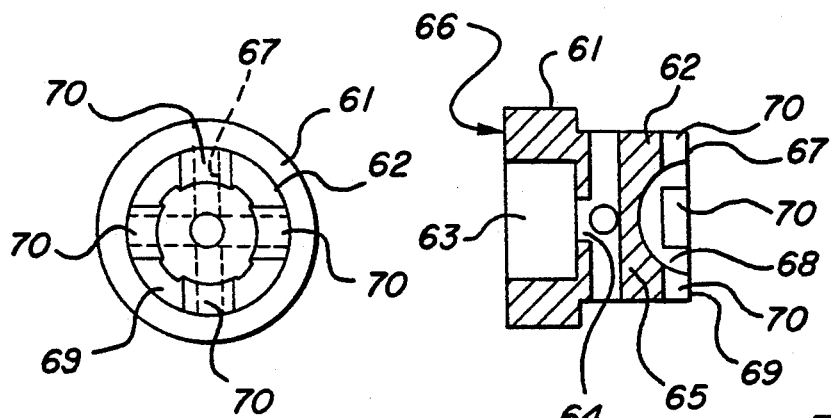
FIGS. 3 and are detail views of a baffle employed in the damper FIG. 2.

Baffle 39 may be formed of a suitable plastic material such as nylon and is shown in detail in FIGS. 3 and 4.

Baffle 39 has a stopped diameter body 60 comprising a larger diameter rearward portion 61 which is slidable in the bore 44 of the housing 37, and which may be sealed relative to the bore 44, and a smaller diameter forward portion 62 which projects axially into abutment with the housing front end wall 42 to form an annular space 53 around the smaller diameter portion 62 and within housing 37. A central cylindrical cavity 63 is provided in the back face 66 of baffle 39 adjacent the front end of piston 38 and connects with the space 53 through a central axial passage 64 and a plurality of circumferentially spaced radial passages 65.

The front end 67 of the baffle adjacent housing front end wall 42 has a hemispherical concave end face 68 therein which is surrounded by an annular outer end face 69. The concave end face 68 communicates with annular space 53 via four radial equiangularly spaced passageways 70 in the annular end face 69.

It will be seen that the forward end of the piston 38 coacts with the bore 44 and the front end wall 42 of housing 37 to define a pressure chamber forwardly of the piston, and that baffle 39 is positioned in the pressure chamber and precludes direct axial communication between the two outlets 43 and 46. Baffle 39 defines a circuitous fluid passage between outlet fittings 43 and 46 extending radially outwardly along passageways 70 on the front face 67 of the baffle, then axially within annular space 53, then radially inwardly through radial passageway 65, and then axially rearwardly along central passageway 64 for communication with passage portion 52 in the piston 38 and thereby with piston central passage 51.

Spring means 40 comprises a plurality of serially arranged Belleville washers 71 positioned in concentric surrounding relation to piston fitting portion 46 and extending between a snap ring 72 seated in a groove in the bore 44 adjacent the rear open end 41 of housing 37 and the back face of piston 38. A spaced or spacers may also be provided in the axial space between snap ring 72 and piston 38, in conjunction with the Belleville washers, to selectively vary the spring force exerted by the spring means.

In use, damper 36 is interposed in conduit 14 with section 14a of the conduit fitted over barbs defined on fitting portion 46 and section 14b of the conduit fitted over barbs defined on fitting 43 so that, thus installed in conduit 14, the central axis of damper housing 37, the axes of piston central passages 51 and 52, and the axes of cavity 63 and passage 64 all lie on a common central axis 54 which is also the central and longitudinal axis of the conduit 14 so that the damper 36 is totally in line with respect to the conduit and presents a compact low profile package relative to the conduit. For example, conduit sections 14a and 14b may be formed of a nylon 12 material and may have an outside diameter of 5/16 inch and housing 37 may have an outside diameter of ⅜ inch. It will be understood that piston 38 and baffle 39 are maintained in a forwardly disposed position, with the front face of the baffle held in abutment with the front end wall 42 of the housing, by the biasing action of Belleville washers 71.

The invention damper has been found to significantly attenuate the vibrations that are transmitted from the crank shaft through the clutch and through the clutch actuator to the clutch pedal and, specifically, has been found to significantly reduce the clutch pedal growl and clutch roar that sometimes accompany hydraulic clutch actuators. During the damping operation, the piston and baffle move reciprocally together in bore 44 and act as a sprung mass added to the hydraulic clutch actuator system, with the effect of attenuating the vibrations being transmitted through the clutch actuator back to the clutch pedal. Whereas the invention damper without the baffle 39 has been found to effect significant reductions in the power density of the vibrations measured at the clutch pedal, more significant reductions in power density are achieved by the invention damper utilizing the baffle 39 and especially significant reductions in power density have been achieved by the invention damper utilizing the hemispherical surface 68 at the front face of the baffle which acts to deflect the fluid carrying the vibrations radially outwardly.

The magnitude of the sprung mass added to the system may of course be readily varied by varying the number of Belleville washers employed in the system so as to allow the invention damper to be readily customized for various and varying vehicular applications. Further, the extremely low profile presented by the invention damper by virtue of its in-line disposition relative to the conduit 14 allows the clutch actuator including the invention damper to be readily routed in the crowded under hood space of a modern day motor vehicle and specifically allows the damper to pass through restricted spaces in the vehicle environment including restricted apertures in vehicular bulkheads. The invention damper is also, by virtue of its extreme simplicity, relatively inexpensive to produce and install as compared to prior art damping devices and has a low weight as compared to prior art damper devices. Further, the hysteresis introduced into the overall system by the damper is extremely small as compared to certain prior art damping devices so as to avoid the introduction of further vibrations into the system because of hysteresis created by the damping device itself.

Figure 5:
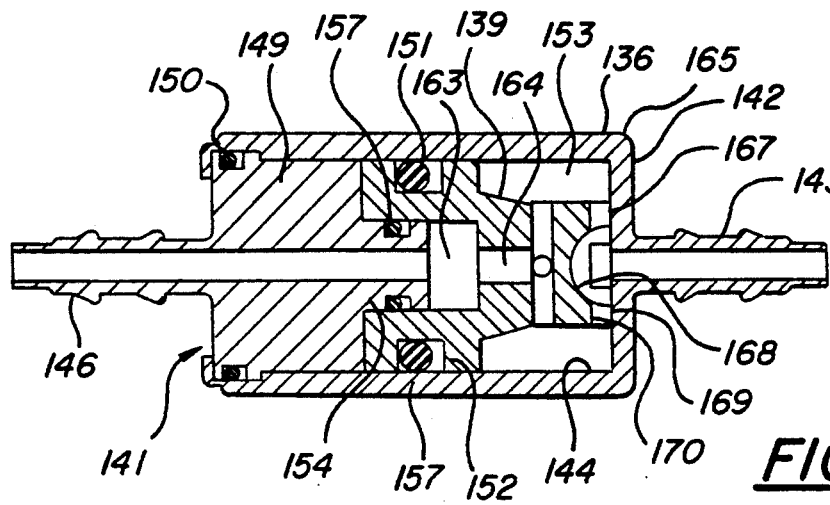
FIG. 5 is a longitudinal section through a second damper embodiment.

With reference to FIG. 5 there is illustrated a second embodiment of the invention in which the damper 136 includes a cylindrical housing 137 with an outlet fitting 143 in the front end wall 142 of the housing for connection to a slave cylinder via conduit section 14b. The rear end 141 of the housing 137 is closed by a cylindrical rear end plug 149 which has a seal 150 located between its outer periphery and the central bore 144 of the housing 137. The second outlet 146 is formed as an integral rearwardly extending portion of end plug 149.

A baffle 139 is located between the front end of plug 149 and the housing front end wall 142 and in abutment with the end plug 149. Baffle 1391 he baffle 39 of the first embodiment excepting that it has a seal 151 located in a peripheral groove to seal between the baffle 139 and the bore 144.

End plug 149 has a forwardly extending central spigot 154 that seats in a central cylindrical cavity 163 in the rear face of the baffle. A seal 157 acts between the outer surface of the spigot 154 and the cavity 163 so that all fluid flow must pass through the central passageway 164 and the radial passageways 165 in the baffle.

The front end face 167 of the baffle has a hemispherical concave end face 168 therein which is surrounded by an annular outer end face 169. The concave end face 168 communicates with the annular space 153 surrounding the front portion of the baffle via four radial equiangularly spaced passageways 170 in the annular end face 169.

The front end face 167 of the baffle is preferably in contact with the housing end wall 142 should in any event be no more than five millimeters away from the end wall with the hemispherical surface 168 coaxially aligned with respect to the outlet 143.

In this embodiment of the invention, substantially the entire damping function is performed by the baffle 139 since there is no significant reciprocal or axial movement of the end plug 149 and baffle 139 within the bore of the housing.

Figure 6:
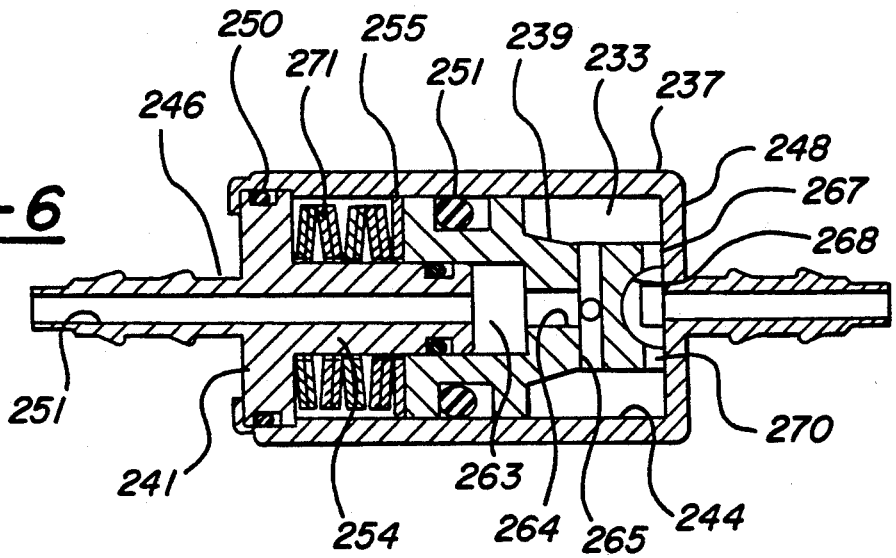
FIG. 6 is a longitudinal section through a third damper embodiment.

With reference to FIG. 6, this embodiment of the invention damper is generally similar to the embodiment of FIG. 5 with the exception that the baffle 239 acts as a combined baffle and piston which is biased toward the front end wall 242 of the housing by a stack of Belleville washers 271. In this embodiment, the rear end plug 241 has an elongated central spigot 254 which extends forwardly toward the front end wall 242 of the housing and is sealingly slidably mounted in a central cavity 263 in the rear face of the baffle 239 to provide a guide for movement of the baffle 239 in housing bore 244 so that the baffle 239 may reciprocate in a damping manner within the bore 244 with the reciprocal movement of the baffle being guided by the spigot 254 of the end plug 241.

Belleville springs 271 are mounted concentric with the spigot 254 and act between the end plug 241 and a spacer ring 255 which abuts the rear face of the baffle 239 to bring the front end face 267 of the baffle against the front end wall 242. A central hemispherical surface 268 in front end face 267 communicates circuitously with the central outlet passage 251 in plug 241 via radial passages 270, annular space 253, radial passage 265, axial passage 264, and cavity 263. In this embodiment of the invention, the damping function occurs as a combined function of damping reciprocal movement of baffle 239 on spigot 254 and the damping flow of fluid against hemispherical surface 268 and thence circuitously through and around the baffle.

Figure 7:
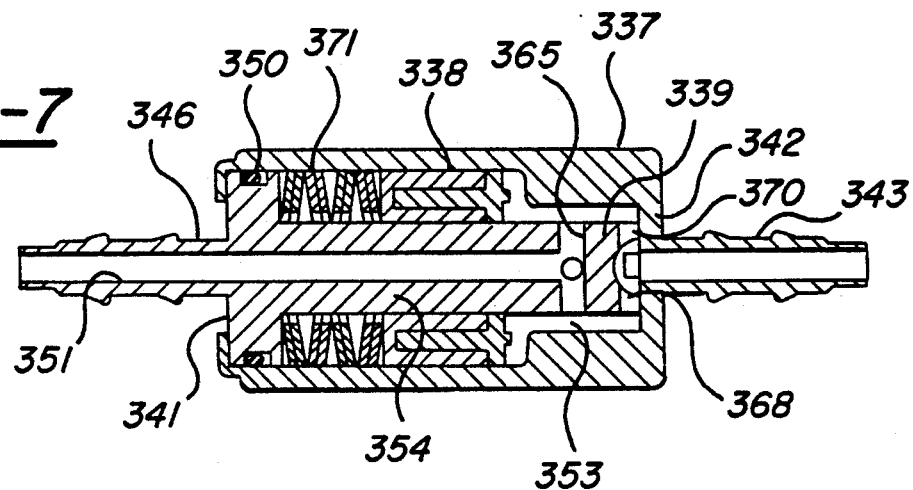
FIG. 7 is a longitudinal section through a fourth damper embodiment.

With reference to the embodiment disclosed in FIG. 7, the damper is again similar to that disclosed in FIG. 5. The open rear end of damper housing 337 is closed by an end plug 341 having an axially rearwardly projecting tubular outlet fitting 346 and an axially forwardly projecting spigot 354 that extends forwardly to abut the housing front end wall 342. The baffle 339 is formed as an integral front end portion of the spigot 354 and includes a hemispherical surface 368 in the front end 367 of the baffle portion. Radial passages 370 communicate hemispherical surface 368 with annular space 353 and radial ports 365 communicate space 353 with the central outlet passage 351 of end plug 341.

An annular piston 338 is sealingly slidably in the bore 344 of the housing 337 with the slidable movement of the piston being guided on and by the spigot 354. Piston 338 is biased toward the front end wall 342 of the housing by a stack of Belleville washers 371 surrounding spigot 354 rearwardly of the piston. In this embodiment the damping function occurs as a combined function of reciprocal damping movement of piston 338 on spigot 354 and the damping flow of fluid against hemispherical surface 368 and thence circuitously through and around the baffle.

Figure 8:
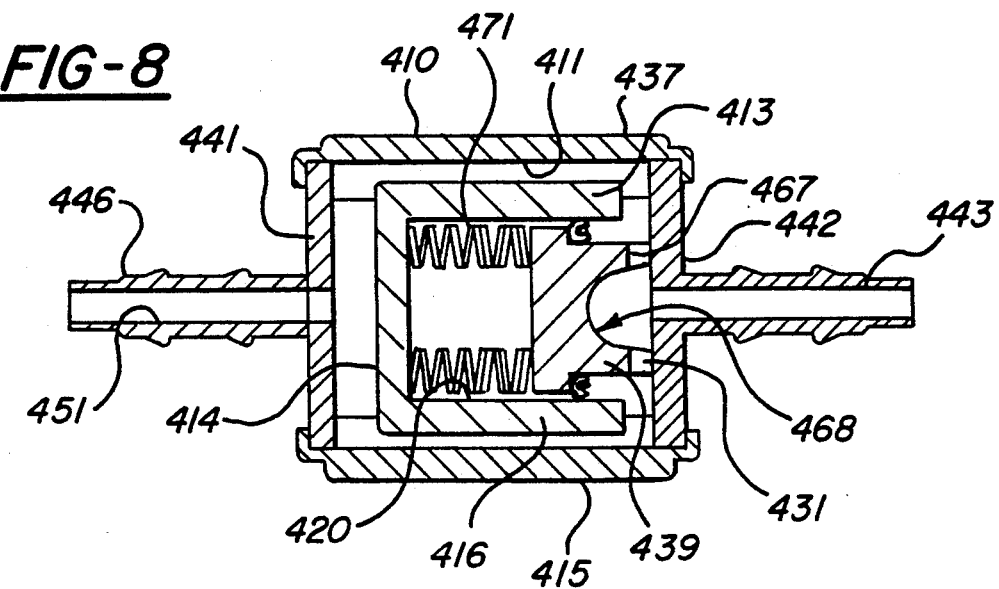
FIG. 8 is a longitudinal section through a fifth damper embodiment.

With reference to FIG. 8, there is disclosed a further embodiment of the invention in which the damper housing 437 is a compound structure including a central cylindrical shell 410 closed at its front end by a cylindrical front end wall 442, defining a tubular outlet fitting 443, and enclosed at its rear end by a cylindrical rear end wall 441, defining a tubular outlet fitting 446.

The baffle 439 of the damper is housed in a cylindrical box 412 which has a slide fit in the cylindrical shell 410 and is ribbed on its external surface so as to provide a plurality of parallel longitudinally extending passageways 411 between the box 412 and the inner periphery of the shell 410. Box 412 includes a cylindrical tubular main body portion 413 and a rear end wall portion 414 coacting with main body cylindrical portion 413 to define a blind bore 420 opening toward the front end of the damper. Baffle 439 is sealingly slidably mounted in the bore 420 and is biased toward the open front end of the bore 420 by a stack of Belleville washers 471 positioned within the bore 420 rearwardly of the baffle 439. A hemispherical surface 468 is provided on the front end face 467 of the baffle 439 to direct fluid radially outwardly for axial passage through passageways 431 for circuitous communication with the central outlet passage 451 of outlet fitting 446. The damping function occurs in this embodiment as a combined function of reciprocal damping movement of baffle 439 in bore 420 and the damping flow of fluid against hemispherical surface 368 and then circuitously around box 42 to outlet passage 451.

Figure 9:
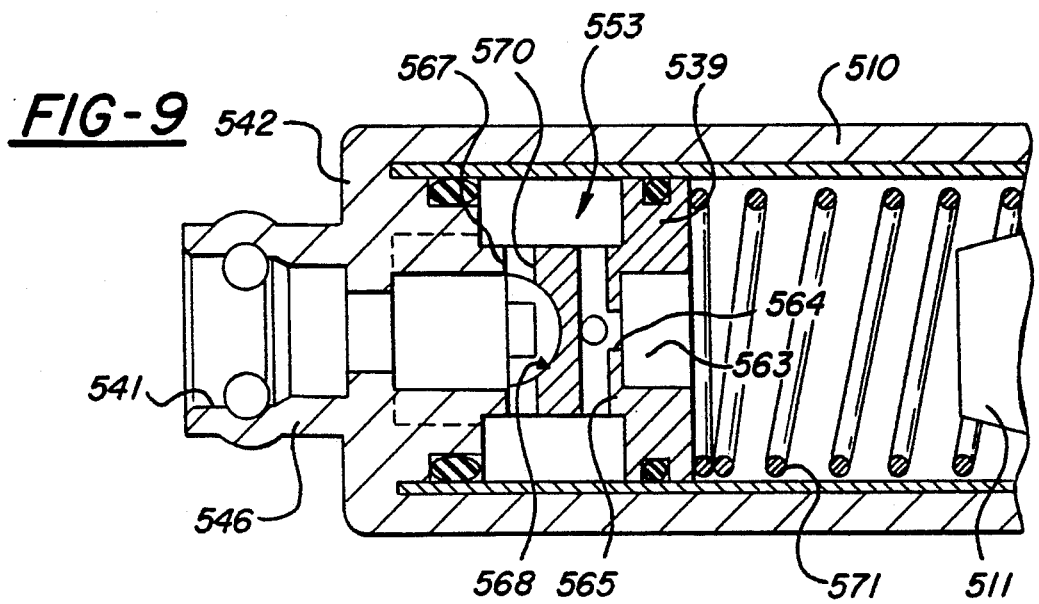
FIG. 9 is a detailed longitudinal section of the output end of a master cylinder with a built-in damper according to the invention.

Yet another embodiment of the invention is disclosed in FIG. 9 in which a baffle 539 is located in the outlet end of a master cylinder 510 and is held in abutment with the front end wall 542 of the housing of the master cylinder, in coaxial alignment with the outlet passage 541 of the cylinder outlet fitting 546, by the return spring 571 for the master cylinder piston 511. A hemispherical surface 568 is provided in the front end face 567 of the baffle in opposition to the outlet 546. Surface 568 coacts with radial passageways 570, annular space 553, radial passages 565, and central passage 564 to provide a circuitous path through the baffle to attenuate transmitted vibrations. The damping function in this embodiment occurs as a combined function of reciprocal damping movement of baffle 539 in the cylinder bore and the damping flow of fluid against hemispherical surface 568 and thence circuitously through and around the baffle.

In the embodiment of the invention damper seen in FIG. 10 the damper is incorporated into a quick connect coupler and, specifically, into a male quick connect coupler for cooperation in known manner with a female quick connect coupler so as to allow the clutch actuator to be provided to the vehicle manufacturer in modular prefilled form for subsequent connection of the quick connect couplers following installation of the modules during the vehicle assembly process.

The invention damper 660 as seen in FIG. 10 includes a housing 662, a piston 664, a spring means 666, a valving member 668, a spring 670, and a disconnect collar or ring 672.

Housing 662 may be formed of a suitable metal such as aluminum or steel and includes a main body cylindrical portion 662a and a front end wall portion 662b defining a valving opening 662c. Housing main body portion 662a is open at its rear end 662d and defines a bore 662e centered on a central longitudinal axis 674. Valving opening 662c is also centered on axis 674.

Housing main body portion 662a further defines an external cylindrical guide surface 662f proximate the forward end of the housing and an annular ridge or bead 662g at the forward end of guide surface 662f.

Piston 664 may be formed of a suitable metal such as aluminum or steel and is generally similar to the piston 38 of the FIG. 2 embodiment. Specifically, piston 664 includes a main body portion 664a, a fitting portion 664b extending rearwardly from the annular rear end 664c of main body portion 664a; an annular groove 664d proximate the forward end 664e of the main body portion receiving an annular seal 676; a further annular groove 664f proximate the rear end of the main body portion receiving a glide ring 678; a pilot or nose portion 664g at the forward end of the main body portion; and a central passage 664h extending through fitting portion 664b and through main body portion 664a and terminating proximate the forward end of the main body portion in a reduced diameter passage portion 664i. Passages 664h and 664i are centered on axis 674.

Spring means 666 comprise a plurality of Belleville washers 680 arranged between the rear annular face 664c of piston main body portion 664a and a snap ring 682 seated in an annular groove in housing main body portion 662a proximate the open rear end 662d of the housing main body portion.

Valving member 668 is sized to fit within bore 662e and sealingly coacts with valving aperture 662c. Valving member 668 includes a main body portion 668a, a rear nose portion 668b, a forward portion 668c, and an annular groove 668d receiving an O-ring 684 for sealing coaction with valving aperture 662c.

Spring 670 comprises a coil spring which is fitted at its rear end over piston nose portion 664g and at its front end over valving member nose portion 668b and is normally operative to bias valving member 668 into a position in sealing coaction with valving aperture 662c to preclude the escape of hydraulic fluid from the pressure chamber 686 defined between the forward end of the piston and housing front end wall portion 662b.

Damper 660 is designed for coupling coaction with a female coupler 690 which may be of the type, for example, shown in applicant's co-pending United States patent application Ser. No. 310,839.

Female coupler 690 includes a tubular housing 692 including a tubular main body portion 692a and a reduced diameter fitting portion 692b extending axially forwardly from the closed front end 692c of the housing and defining a discharge port 692d; an apertured disk 694 positioned in the forward end of the housing by a retainer ring 696: a stem or rod 698 extending axially rearwardly from disk 694 and including an enlarged head portion 698a at its rear free end defining an annular groove carrying an annular seal 700; a valving member 702 slidably mounted in the bore 692e of housing main body portion 692a; a coil spring 704 positioned around stem 698 and extending between retainer ring 696 and an interior annular shoulder 702a defined by valving member 702 and operative to bias valving member 702 into sealing coaction with annular seal 700; and a split retainer clip 706, formed of a spring steel and including a plurality of resilient finger portions 706a, fitted in an annular interior seat 692f defined proximate the rear end of housing main body portion 692a.

It will be understood that female coupler 690 coacts in known manner with the male coupler portion of damper 660 in response to insertion of the front end 662h of housing 662 into bore 692e of the housing of the female coupler to move valving member 668 away from aperture 662c and move valving member 702 away from seal 600 so as to provide fluid communication through the coupled couplers with the male member being held securely within the female member by snapping engagement of the free ends of spring finger portions 706a behind ridge 662g and with ring 672 accessible by an operator to release the spring finger portion 706a from engagement with ridge 662g in response to forward sliding movement of ring 672 on guide surface 662f so as to allow uncoupling of the couplers. Further details of coupler 690 are disclosed in copending U.S. application Ser. No. 310,839.

Female coupler 690 is fitted to conduit section 14b and damper 660 is fitted to conduit section 14a so that when the damper 660 is fitted into the female coupler 690 a continuous fluid path is established between the master cylinder and the slave cylinder so as to enable engagement and disengagement of the clutch in response to pivotal movement of the associated clutch pedal of the vehicle. The piston 664 of the damper 662 serves as a sprung mass added into the system and serves to significantly attenuate the vibrations being transmitted from the engine crankshaft through the clutch actuator to the clutch pedal so that the power density of the vibrations, as sensed by an accelerometer mounted proximate the clutch pedal, is significantly reduced as compared to an undamped system.

In all of the disclosed embodiments, the clutch actuator is preferably provided to the motor vehicle manufacturer in a prefilled form constituting, in the case of the FIGS. 1-9 embodiments, a single prefilled assembly including the master cylinder, conduit and slave cylinder and constituting, in the case of the FIG. 10 embodiment, a first prefilled module including the master cylinder, the conduit section 14a, and the damper 662, and a second prefilled module including female coupler 690, conduit section 14b, and the slave cylinder. In all embodiments of the invention, the invention damper significantly attenuates the vibrations transmitted from the crankshaft to the clutch pedal; allows ready tailoring of the damper to suit a wide variety of vehicular applications; provides a simple and inexpensive package; and provides a compact and readily routable package by virtue of the in line disposition of the damper.

Whereas preferred embodiments of the invention have been illustrated and described in detail, it will be apparent that various changes may be made in the disclosed embodiments without departing from the scope or spirit of the invention.

We claim:

1. A damper for use in a hydraulic actuation system of the type comprising a master cylinder, a slave cylinder and a conduit interconnecting the master cylinder and slave cylinder, said damper comprising:
    a hollow body having a central axis and defining a first end wall,
    a first port in the first end wall,
    a second port, and
        a baffle member located in the hollow body between the two ports and defining a circuitous fluid flow path between the first and second ports, said baffle member having a concave hemispherical end face thereon directed toward the first port and defining a plurality of radial passageways spaced circumferentially about the central axis and communicating at their radially inner ends with said concave hemispherical end face, said radial passageways comprising the initial portion of said circuitous fluid flow path so that fluid entering said first port is deflected by the hemispherical surface radially outwardly into and through said radial passageways for flow through the remainder of the circuitous flow path.

2. A damper as claimed in claim 1 wherein the baffle member is in abutment with said first end wall.

3. A damper as claimed in claim 2 wherein the baffle member includes a main body and the outer periphery of the main body is in sliding contact with the hollow body and has a forward projection thereon radially spaced from the hollow body and the hemispherical surface on the end face of the baffle member is connected to the second port by said radial passageways and by further axial and transverse passageways through the baffle member.

4. A damper as claimed in claim 3 wherein the baffle member is fixed axially relative to the hollow body and is in sealing contact with the hollow body.

5. A damper as claimed in claim 4 wherein the hollow body has a second end wall and the second port is defined in the second end wall, and said baffle member is in abutment with the second end wall.

6. A damper as claimed in claim 3 wherein the baffle member is in abutment with a piston axially slidable in the hollow body independently of said baffle member and spring biased toward the first end wall, the piston having a fluid passageway therethrough forming a continuation of said circuitous fluid flow path defining in said baffle member.

7. A damper as claimed in claim 3 wherein the baffle member is an integral part of a piston axially slidable in the hollow body and spring biased towards the first end wall, the piston having a fluid through passageway therein.

8. A damper as claimed in claim 7 wherein the hollow body is cylindrical and includes a second end wall with the second port defined therein, the second end wall having an integral coaxial spigot which extends from the second end wall towards the first end wall, the spigot having a coaxial fluid passageway therethrough and acting as a guide for the piston.

9. A damper as claimed in claim 2 wherein the hollow body is cylindrical and includes a second end wall with the second port defined therein, the second end wall having an integral coaxial spigot which extends to said first end wall with the baffle means formed integrally with an spigot, and said hemispherical surface is formed on the end face of the spigot in abutment with said one end wall.

10. A damper as claimed in claim 9 wherein there is further provided a piston slidable in the body and which is spring biased towards the first end wall, the piston being also guided for sliding by the spigot.

11. A damper as claimed in claim 1 wherein the hollow body includes a second end wall with the second port defined therein and the baffle member comprises a box having a closed end adjacent the second end wall and an open end adjacent the first end wall, spring means located in the closed end of the box, and a cap sealingly slidable in the box and which is biased by the spring means towards the first end wall, wherein said hemispherical surface is formed on the cap and the circuitous fluid flow path is defined between the box and the hollow body of the damper.

12. A damper as claimed in claim 11 wherein the box has an air chamber therein in which said spring means are housed.

13. A damper for use with a hydraulic clutch actuator of the type including as master cylinder, a slave cylinder, and conduit means interconnecting the master and slave cylinders, said damper being provided in said conduit means and including:
    an axially extending housing having a front end and a rear end and defining an axial bore having a central axis and bounded at the front end thereof by a front end wall of said housing;
    means defining a first port in said front end wall for connection in said conduit means;
    a piston having a front end and a rear end and mounted for reciprocal axial movement in said bore;
    means defining a second port proximate the rear end of said housing for connection in said conduit means;
    passage means extending axially through said piston in coaxial relation to said first and second ports from an entry at said front end of said piston to an exit at said rear end of said piston;
    means defining a circuitous passage, including radially and axially extending portions, extending between said first port and the entry of said passage means; and
    spring means biasing said piston forwardly towards said front end wall of said housing.

14. A damper according to claim 13 wherein:
    said passage means comprises a central axial passage extending through said piston coaxial with said central axis.

* * * * *